May 12, 1936. H. F. HOBBS 2,040,136
AUTOMATICALLY VARIABLE TRANSMISSION GEAR PARTICULARLY FOR MOTOR VEHICLES
Original Filed June 27, 1931
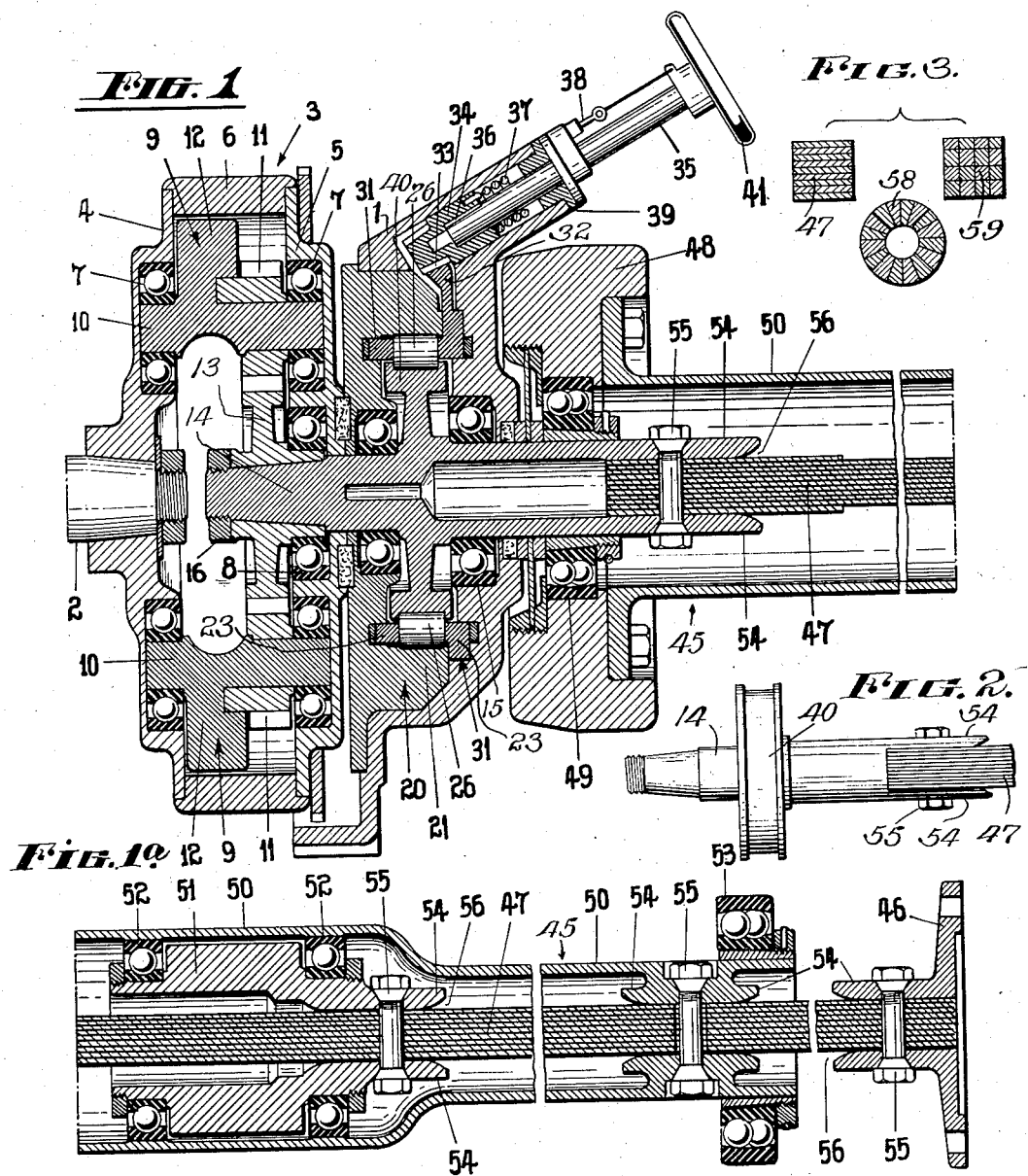
INVENTOR
H. F. Hobbs
BY
ATTORNEY Patented May 12, 1936

2,040,136

UNITED STATES PATENT OFFICE 2,040,136

AUTOMATICALLY VARIABLE TRANSMISSION GEAR PARTICULARLY FOR MOTOR VEHICLES

Howard Frederick Hobbs, Paradise, South Australia, Australia

Application June 27, 1931, Serial No. 547,352. Renewed December 15, 1934. In Australia September 2, 1930

11 Claims. (Cl. 74—260)

This invention relates to an automatically variable transmission gear of the type comprising planetary masses which tend to oscillate a driven member, which is prevented from moving other than in the desired direction, the purpose of the invention being to provide an improved variation in the ratio of speeds between the driver and the driven shafts, such gear being especially suitable for the power transmission in motor vehicles but applicable also to other purposes where a variable transmission gear is required.

My invention comprises an automatically variable transmission gear of the type herein described, comprising in combination a driver shaft having a disc, frame, or casing, carrying one or more sets of planetary masses movable on their own axes and revolving about the driver shaft axis, said set or each of them being geared by toothed gearing to, and thus tending to oscillate, intermediate means which (or each of which if more than one) is prevented by a detent from rotating in a direction other than that required and is flexibly coupled (other than by a coupling of comparatively large inertia such as a helical or coil spring) by a torsional spring or springs (one for each set of intermediate means) each spring having its one end connected to its respective intermediate means and its other end connected to a shaft or wheel, the latter being caused to rotate smoothly at such speeds relatively to the speeds of the driver shaft as to suit the load.

The inertia of the oscillating parts of the gear comprises the inertia of the intermediate means plus about half of the inertia of the spring since only the half adjacent to the intermediate means will affect the inertia of said means. The inertia of the oscillating parts must be as low as possible consistent with the strength and flexibility necessary to bear the power to be transmitted. If the inertia of the oscillating parts is too great (depending upon the power to be transmitted, size and frequency of the planetary masses, and other factors) the gear will either cease to transmit power above a certain very low road speed or will operate in very unsatisfactory gear ratios. For example a helical spring having its ends attached respectively to the intermediate means and to the driven shaft or wheel is not suitable since the inertia of an otherwise suitable helical spring is too great. The term "torsional spring" herein employed is therefore intended to exclude a helical spring or other spring the inertia of which is so large as to produce these defects.

The term "torsional spring" is herein used to denote only a spring which is twisted about its longitudinal axis and which comprises one or more longitudinally arranged bars; or, in other words, the term "torsional spring" is intended to imply a spring in which the load applied to the spring results mainly in torsional or shear stress in the material of the spring.

The term "planetary mass" is herein used to describe a weight the centre of gravity of which is rotatable about an axis offset from the centre of gravity and offset from the driver shaft axis and is also rotatable about the driver shaft; and a "set of planetary masses" refers to two or more masses which act in unison on the intermediate means.

The planetary masses or weights are caused to move first eccentrically and finally concentrically about co-axial shafts, one of such shafts (the driver) rotating in a fixed direction and carrying the weights around with it, the other (the driven) being reversible for forward or reverse drive and rotatable through one or more intermediate co-axial shafts provided with means to cause the weights to move eccentrically in all speeds other than when the driver and driven shafts are rotating at the same speed and in the same direction. In ratios other than top gear or one to one ratio the intermediate shaft will mainly tend to oscillate under the alternating torque from the weights and will react on the detent whereby substantially all backward movement of the shaft will be prevented. At some instantaneous moment before entering top gear, or for a longer period under certain conditions of load and speed, there will be no reaction on the detent and the shaft will be alternately speeding up and slowing down. In forward drive top gear or one to one ratio the intermediate shaft or each of them will rotate constantly in the same direction and at substantially the same speed as the driven shaft and the weights will remain in their outermost positions by reason of the centrifugal force thereon. When the shaft is tending to oscillate the detent or ratchet will prevent rotation of the shaft in one direction and the drive thus comprises unidirectional impulses, the direction of which can be changed at will by means of the detent or ratchet. When the shaft is alternately speeding up and slowing down there will be no reaction on the detent or ratchet. In top gear or one to one ratio the speed of the driver and of the driven shaft are substantially equal and in the same direction and the weights then move concentrically about the shafts and transmit a steady undirectional torque to the intermediate shaft or shafts and thus through the flexible couplings to the driven shaft.

The oscillatory system comprising the pinions and their bearings, the sun wheel, the intermediate shaft, the inner member of the roller clutch (integral with the intermediate shaft), and the spring shaft, has a natural frequency of oscillation at which the gear tends to operate when in indirect ratios (other than in top gear when the weights remain in their outermost positions). In other words, this system will tend to force the weights into a corresponding or synchronizing frequency. Such synchronism between the frequency of impulses delivered to the sun wheel by the weights, and the frequency of oscillation of the said system, is essential for practical operation of the gear. The frequency of impulses of the weights will, in the gear shown, equal the natural frequency of oscillation of the said system between certain speeds (say about 5 to 35 M. P. H. road speed) and at higher speeds the frequency of impulses of the weights can fall to about half so as still to synchronize with the frequency of the system but so as to reduce engine speed which is desirable. At very high speeds the frequency of impulses of the weights can fall to about one quarter of the natural frequency of oscillation of said system.

When starting a car, the weights will have a high frequency and will force said system to operate at the same frequency but at about 5 to 10 M. P. H. the system will cause the weights to operate at the said natural frequency and the short period preceding this action tends to be noisy or rough if the inertia of the intermediate parts is slightly too great or if the inertia is greater still the gear will fail to operate. The intermediate parts comprise the sun wheel and the parts which affect the inertia of the sun wheel, i. e., the intermediate shaft, inner clutch member, and about one half of the spring shaft, if flywheels 51 are not provided. If one or more flywheels 51 is provided the inertia of the sun wheel will be affected by different lengths of the spring shaft at different speeds and the "intermediate parts" will include such different lengths of the spring shaft at different times. In the region of said short period practically only that part of the spring shaft that is in front of the first flywheel 51 is included in the intermediate parts. It is, however, found unnecessary in practice to attach one or more flywheels to the spring shaft between its ends.

The inertia varies with the square of the radius and the radius of the spring shaft is therefore important. The mass of the spring shaft of the present invention is close to the axis about which it twists and this enables the inertia of the spring shaft to be brought within the required limits which is not possible, for example, with a helical spring.

The spring shaft must be capable of withstanding rapid reversals of stress and carrying the desired torque. The spring should flex at least 50° in each direction.

It is to be observed that the planetary weights are carried by the driven shaft and the sun wheel is carried on the intermediate shaft, but the reverse of this arrangement would cause the weights and their bearings to increase the inertia of the intermediate parts considerably beyond the permissible limit.

The rear end of the spring or the shaft which it drives must carry a flywheel unless it is connected to machinery which acts on it as a flywheel mass or counterpoise.

A solid round shaft, tube, flat plate, or plates, or other form of spring, may be employed if it has the necessary low inertia, and sufficient strength and flexibility. The spring will usually comprise one or more straight rods or plates and whilst a slight helical twist would not be objectionable a spring comprising numerous helical coils will not be suitable.

The spring will preferably be supported between its ends to avoid "whipping" action, and this support is provided by the bearing 52 interposed between the spring and the tube. Such a bearing, however, will not be required for less than about two feet length of spring.

It will be found that a spring less than about 20 inches in length will not give very good results, and hence the spring is preferably much longer and may be four or five feet long if the space is available. The spring will preferably be at least three times as long as the intermediate shaft.

In order that my invention may be the more clearly understood I will describe the same with reference to the accompanying drawing in which:—

Fig. 1 is a central vertical section of my gear adapted to be applied to a motor car.

Fig. 1a is a longitudinal sectional view of the rear portion of the flexible coupling.

Fig. 2 is a side elevation of the intermediate shaft showing also the front end of the spring of the flexible coupling.

Fig. 3 shows cross sections of various forms of springs which may be used in the flexible coupling.

The gear constituting the invention is contained in a housing 1 attached to the chassis of the vehicle or to a suitable frame.

The driver shaft 2 from the engine of the vehicle has rigidly secured upon its end a frame or casing which carries a set of weights which also act as a fly wheel to the engine.

The frame or casing 3 comprises a front plate 4 a rear plate 5 and an annular distance piece 6 all rigidly held together. The two plates 4 and 5 have in their faces equally spaced recesses in which are the bearings 7 for the weights of the set, and in the rear plate 5 there is a bearing 8 for the intermediate shaft, the latter bearing being co-axial with the driver shaft 2.

Each of the weights 9 of the set comprises a spindle 10 a pinion 11 and a block 12, the pinion 11 being on any convenient part of the spindle 10 but the block 12 projecting out from same so that its centre of gravity is some distance from the axis of the spindle 10.

The pinion 11 of each weight of the set engages a gear wheel 13 upon an intermediate shaft 14 which is in line with the driver shaft 2 and has its front end supported in the bearing 8 in the rear plate 5 of the frame or casing 3 and its rear end supported in a bearing 15 in the gear housing 1. The gear wheel 13 is preferably held to the intermediate shaft 14 by a key and a lock nut 16.

The ratchet gear 20, the purpose of which is to check any rotation of the intermediate shaft 14 in a direction opposite to that which is required, comprises an outer fixed member 21, a roller cage 23 and an inner rotating member 40.

The outer member 21 is ring-shaped and is concentric with the intermediate shaft 14 having a radius somewhat smaller than the radius of the inside of the member, and is secured to the housing of the gear.

The roller cage 23 houses a plurality of rollers 26. The cage 24 is held in position by its outer edges entering circular grooves 31 in the outer member 21 and in the housing 1, and it has an upwardly projecting stem 32 which terminates in a small toothed segment 33 engaged by a small pinion 34 on a control shaft 35.

The pinion 34 is loose on the shaft 35 but has within it a keyway which fits over a lug 36 upon the shaft 35. The keyway is of greater width than the lug and the pinion can thus rock upon the shaft but it is normally held in its one position by a spring 37 which has its one end connected to the pinion 34 and its other end connected to the control shaft 35. This gives a slight flexibility and allows the cage 23 to adapt itself to its best working position. The shaft 35 is locked in position by a pin 38 engaging holes in a member 39 secured to the housing 1 of the gear. The control shaft 35 is provided with a hand wheel 41 which is slidable upon the shaft and which is prevented from rotating thereon by a spline. The pin 38 is connected to the wheel 41 so that it is raised and lowered with the wheel.

The inner rotating member 40 is formed integral with the intermediate shaft 14 and fits neatly within the cage 23, the rollers 26 contacting with the outer face of such member 40.

Just behind the ratchet gear 29 is the flexible coupling 45 which links the intermediate shaft 14 to the driven shaft 46.

This coupling comprises a torsional spring 47 preferably built up of a number of flat leaves, one upon the other. One end of such spring 47 is attached to the intermediate shaft 14 and the other end is attached to the driven shaft 46. In the drawing I have shown 46 as a coupling but this coupling forms part of the driven shaft.

As shown in Fig. 1 the spring 47 is provided with a main flywheel 48 which is supported on a bearing 49 upon the intermediate shaft 14 and adjacent the end of the gear housing 1. This fly wheel is connected by a concentric tube 50 to the spring 47 near its rear end. Within this tube 50 are carried one or more auxiliary fly wheels 51 which are supported by bearings 52 within the concentric tube 50 and which are rigidly attached to the spring 47. The rear end of the concentric tube 50 is supported in a bearing 53 attached to any suitable support. The bearings 52 support the spring against movement in the radial direction between its ends or supports. However, a support is not required for a length of spring less than about two feet.

The attachment of the spring 47 to the ends of the intermediate shaft 14 and of the driven shaft 46, and the attachment of the concentric tube 50 and fly wheels 51 to the spring in each case preferably consists of a pair of fingers 54 upon such part adapted to grip the spring 47 at that point. A bolt or rivet 55 passing through a perforation in such fingers 54 and in the spring 47 holds the spring in place within the fingers. The ends of the fingers 54 are tapered off as shown at 56 to prevent fracture of the spring.

By means of the spring 47 of this flexible coupling 45 the intermittent impulses of the intermediate shaft 14 are turned into a more or less constant torque, the spring 47 being wound up as the impulses are applied to its front end by the gear and unwinding constantly at its other end and so rotating the driven shaft 46.

Instead of using a number of fly wheels only one may be used in which case it is attached intermediate the ends of the spring.

Instead of constructing the spring 47 of square sections and built up of flat leaves as shown in Figs. 1, 1a and 2, for example of the drawing it may be constructed of leaves of other suitable section such for instance as those shown at 58 and 59 of Fig. 3. Instead of building the spring up of leaves it may be formed of a shaped piece of spring steel having a number of longitudinal cuts through it. It may be built up of short lengths joined together by suitable couplings.

I will now describe the operation of my device.

When the driver shaft 2 is rotated it carries with it the frame or casing 3 which is attached to it and which carries the set of weights 9. When starting, as the weights move around their intermediate shaft 14 they are rotated also about their spindles 10 through the pinions 11 on the spindles meshing with the gear wheel 13 upon the intermediate shaft 14 which shaft is then stationary or gradually speeding up and thus the centres of gravity of the blocks 12 of the weights trace out eccentric paths around the axis of the driver shaft 2.

It will be seen that the blocks 12 in their eccentric course may move inwards once for part of a revolution or once for one or more revolutions depending upon the difference in speeds between the driver and driven shafts.

As the speed of the driver shaft 2 increases, the centrifugal force on the weights 9 increases causing the blocks 12 to tend to stay in their outermost position.

Acting against this force, however, is the resistance of the intermediate shaft 14 which is connected by the flexible coupling 45 to the driven shaft 46 the resistance of which is governed by the load upon it.

As the weights 9 are being rotated the centres of gravity of their blocks 12 are being pulled inwards by said load through the coupling and the sun wheel 13 against the outward action of the centrifugal force for half of their revolution about their spindles 10, during which period the centrifugal force imparts driving force to the sun wheel, coupling and driven shaft, but are pulled outwards by the action of the centrifugal force for the other half of their revolution.

Thus it will be seen that the weights 9 require a driving force during their inward movement, but exert a driving force during their outward movement. Thus the reaction of the set of weights during its inward movement tends, through the pinions 11 and gear wheel 13, to drive the intermediate shaft 14 around in the same direction as the driver shaft 2 is rotating, but during the outward movement the weights tend to drive the intermediate shaft 14 in the opposite direction.

The intermediate shaft 14 thus tends at first to be driven in a forward and backward alternating direction, but by means of the ratchet 20 all movement in one direction is prevented, the intermediate shaft 14 thus rotating in one direction only, but by a series of short impulses. The flexible drive coupling 45 between the intermediate shaft and the driven shaft and flywheel thereon transforms these intermittent impulses into a constant rotation and exerts a more or less steady automatically variable low ratio drive in either direction, the direction depending only on the positioning of the cage 23 which controls the rollers 26 of the ratchet gear 20.

When the ratchet gear 20 is so set that the driver shaft 2 and the driven shaft 46 are rotating in the same direction the speeds of the driver and the driven shaft will at first be greatly different, but the speeds of these two shafts become more nearly equal as top gear or one to one gear ratio is approached.

When the resistance of the driven shaft is equal to or less than the drive exerted by the driver shaft the weights take up a constant position which is governed by the force and speed of the driver shaft and the resistance and speed of the driven shaft. The resultant speed ratio between the driver and driven shafts is in this case of a one to one ratio. When several sets of weights are used, the action is similar to the above, although in the lower ratios the weights tend to act more or less independently, but as the ratio increases, and especially when a one to one ratio is attained, the independent action is lost and the whole of the weights act in mutual conjunction. The flexibility of the springs such as 47, etc., of the coupling here help to determine the position of the weights near to, and in, the one to one ratio.

In the gear described when the impulses given to the spring 47 of the flexible coupling 45 are short and of high frequency as during the time when the ratchet 20 is in operation it is desirable to use only a short spring to obtain maximum efficiency, but as the impulses increase in length and decrease in frequency a longer spring is desirable as it again increases the efficiency and gives a more constant drive.

By means of the fly wheels 51 intermediate the ends of the torsional spring 47 this object is achieved as the fly wheels by reason of their momentum cannot follow quick fluctuations. The first fly wheel therefore damps out any very high fluctuations at the point of the spring to which it is attached the rest of the spring simply acting as a driven shaft but, as the frequency decreases, such fly wheel starts to follow the fluctuations which however are reduced by it and are damped out by the second fly wheel. The length and strength of spring and number of fly wheels should be such that the slow fluctuations prior to the one to one ratio are effectively smoothed out.

What I claim is:—

1. An automatically variable transmission gear comprising a driving shaft, one set only of planetary masses carried by the driving shaft, an intermediate shaft, a sun wheel mounted on the intermediate shaft pinions connected with the set of masses and in gear with the sun wheel whereby the intermediate shaft is actuated by the centrifugal impulses of the masses, a clutch device co-operating with the intermediate member to prevent it from rotating in a direction other than the desired direction, a driven shaft, a laminated spring connected at one end to the intermediate shaft and at its other end to the driven shaft, and at least one flywheel attached to the said spring intermediate the ends thereof.

2. An automatically variable transmission gear comprising a driving shaft, one set only of planetary masses carried by the driving shaft, an intermediate shaft, a sun wheel mounted on the intermediate shaft pinions connected with the set of masses and in gear with the sun wheel whereby the intermediate shaft is actuated by the centrifugal impulses of the masses, a clutch device co-operating with the intermediate member to prevent it from rotating in a direction other than the desired direction, a driven shaft, a number of straight bars connected together to form a laminated torsion spring connected at one end to the intermediate shaft and connected at its other end to the driven shaft so that the spring will twist about an axis disposed longitudinally through said spring, and at least one flywheel attached to the said spring intermediate the ends thereof.

3. An automatically variable transmission gear comprising a driving shaft, one set only of planetary masses carried by the driving shaft, an intermediate shaft, a sun wheel, and pinions between the intermediate shaft and the set of masses whereby the intermediate shaft is actuated by the centrifugal impulses of the masses, a clutch device co-operating with the intermediate member to prevent it from rotating in a direction other than the desired direction, a driven shaft, and a laminated spring connected at one end to the intermediate shaft and at its other end to the driven shaft, said laminated spring comprising a number of straight square sectioned rods attached together.

4. An automatically variable transmission gear as in claim 2, having a bearing adjacent to the intermediate shaft and carrying the flywheel, and a member connecting the flywheel to the spring at a point some distance from the intermediate shaft.

5. An automatically variable transmission gear as in claim 2 having a bearing adjacent to the intermediate shaft and carrying the flywheel, a tube encircling the spring and attached at one end to the flywheel and at its other end to the spring, at least one further flywheel attached to the spring and located within said tube, and a bearing between said further flywheel and the inside of the tube.

6. An automatically variable transmission gear comprising a driving shaft, one set only of planetary masses carried by the driving shaft, an intermediate shaft, a sun wheel carried by the intermediate shaft, a number of pinions equivalent to the number of masses each of which pinions gears one of the masses to the sun wheel, an annular clutch member carried by the intermediate shaft, a non-rotatable clutch member, balls or rollers between the annular member and the non-rotatable clutch member, inclined portions on one of said members for engagement by the balls or rollers and suitable both for forward and reverse drive, a cage for the balls or rollers, means for adjusting the cage to move the balls or rollers into forward or reverse drive positions, a driven member and a non-coiled spring shaft comprising at least one longitudinal elongated bar connected at one end to the intermediate shaft and at its other end to the driven member so that the spring shaft will be twisted about an axis disposed longitudinally through said spring shaft.

7. An automatically variable transmission gear comprising a driving shaft, one set only of planetary masses carried by the driving shaft, an intermediate shaft, a sun wheel carried by the intermediate shaft, a number of pinions equivalent to the number of masses each of which pinions gears one of the masses to the sun wheel, an annular clutch member carried by the intermediate shaft, a non-rotatable clutch member, balls or rollers between the annular member and the non-rotatable clutch member, inclined portions on one of said members for engagement by the balls or rollers and suitable both for forward and reverse drive, a cage for the balls or rollers, means for adjusting the cage to move the balls or rollers into forward or reverse drive positions, a driven member and a non-coiled spring shaft comprising at least one longitudinally elongated bar at least three times as long as the intermediate shaft connected at one end to the intermediate shaft and at its other end to the driven member so that the spring shaft will be twisted about an axis disposed longitudinally through said spring shaft.

8. An automatically variable transmission gear comprising a driving shaft, one set only of planetary masses carried by the driving shaft, an intermediate shaft, a sun wheel mounted on the intermediate shaft and pinions connected to the respective masses and in gear with the sun wheel whereby the intermediate shaft is actuated by the centrifugal impulses of the masses, an annular clutch member carried by the intermediate shaft, a non-rotatable clutch member, balls or rollers between the annular member and the non-rotatable clutch member, a driven member, a non-coiled spring shaft comprising at least one longitudinally elongated bar connected at one end to the intermediate shaft and at its other end to the driven member so that the spring shaft will be twisted in both directions about an axis disposed longitudinally through said spring shaft, a tube surrounding the spring shaft and attached to the rear end of said spring shaft so as to rotate therewith, a flywheel mounted on the tube, and at least one bearing disposed between the spring shaft and the tube inside the tube.

9. An automatically variable transmission gear according to claim 7, having a tube surrounding the spring shaft and attached to the rear end of said spring shaft so as to rotate therewith, a flywheel mounted on the tube, and at least one bearing disposed between the spring shaft and the tube inside the tube.

10. In an automatically variable transmission gear, the combination, with a rotatable driving shaft, of a single group of distinct planetary masses carried by said driving shaft, a second or intermediate shaft, a driven shaft, a sun wheel mounted on said second shaft, pinions connected with said planetary masses and in gear with said sun wheel thereby causing the centrifugal impulses of said planetary masses to actuate said second shaft, a clutch mechanism cooperating with the second shaft and limiting rotation thereof to solely one predetermined direction, a plurality of flat and resilient plates attached together in superposed relation so as to form as an associated group a laminated torsion spring of substantially uniform compact form throughout, connected at one end to said second shaft and at the other end to aforesaid driven shaft in order to render said torsion spring capable of twisting about an axis passing longitudinally through the spring as a whole, while positively eliminating any buckling of said spring or of any section or of any of the flat plates composing the same, a pair of bevelled fingers disposed at each end of said laminated spring and gripping the same while eliminating any danger of fracture of the spring during excessive torsion thereof, and a retaining bolt at each end of the spring passing through the spring and the fingers and retaining the same in assembled relation.

11. In an automatically variable transmission gear, the combination, with a driving shaft, of a single group of planetary masses carried by the driving shaft, an intermediate shaft, a sun wheel mounted on the intermediate shaft, pinions connected to the planetary masses and in gear with the sun wheel whereby the intermediate shaft is actuated by the centrifugal impulses of the masses, a one-way clutch device cooperating with the intermediate member to prevent it from rotating in a direction other than the desired direction, a driven shaft, a spring shaft comprising at least one longitudinally disposed spring bar and connected at one end to the intermediate shaft and at its other end to the driven shaft, a tube surrounding the spring shaft and attached to the spring shaft at its rear end so that the tube and spring shaft rotate together and the spring shaft can oscillate about its longitudinal axis relatively to the tube, and bearings between the spring shaft and the interior portions of the tube.

HOWARD FREDERICK HOBBS.